United States Patent
Maeda et al.

(10) Patent No.: US 7,845,721 B2
(45) Date of Patent: Dec. 7, 2010

(54) HEADREST

(75) Inventors: Kazuyasu Maeda, Anjo (JP); Akinobu Makino, Anjo (JP); Asato Matsuura, Anjo (JP); Ken Tatematsu, Anjo (JP)

(73) Assignee: Inoac Corporation, Aichi (JP)

( * ) Notice: Subject to any disclaimer, the term of this patent is extended or adjusted under 35 U.S.C. 154(b) by 20 days.

(21) Appl. No.: 12/011,857

(22) Filed: Jan. 30, 2008

(65) Prior Publication Data

US 2008/0191522 A1 Aug. 14, 2008

(30) Foreign Application Priority Data

Feb. 14, 2007 (JP) ............... 2007-34011
Mar. 8, 2007 (JP) ............... 2007-59024

(51) Int. Cl.
*B60N 2/427* (2006.01)

(52) U.S. Cl. ................................. 297/216.12

(58) Field of Classification Search ............ 297/216.12, 297/408, 410
See application file for complete search history.

(56) References Cited

U.S. PATENT DOCUMENTS

| | | | | | |
|---|---|---|---|---|---|
| 4,483,565 | A | * | 11/1984 | Terui et al. ................... | 297/410 |
| 5,738,412 | A | * | 4/1998 | Aufrere et al. ............... | 297/408 |
| 5,842,738 | A | * | 12/1998 | Knoll et al. ............ | 297/216.12 |
| 6,079,776 | A | * | 6/2000 | Breitner et al. ........ | 297/216.12 |
| 6,082,817 | A | * | 7/2000 | Muller ................... | 297/216.12 |
| 6,250,714 | B1 | * | 6/2001 | Nakano et al. ......... | 297/216.12 |
| 6,550,856 | B1 | * | 4/2003 | Ganser et al. ................... | 297/61 |
| 6,688,697 | B2 | * | 2/2004 | Baumann et al. ............. | 297/391 |
| 6,779,840 | B1 | * | 8/2004 | Farquhar et al. ....... | 297/216.12 |
| 6,802,562 | B1 | * | 10/2004 | Hake et al. ............. | 297/216.12 |
| 6,890,029 | B2 | * | 5/2005 | Svantesson ............ | 297/216.12 |
| 7,070,235 | B2 | * | 7/2006 | Schilling et al. ....... | 297/216.12 |
| 7,293,829 | B2 | * | 11/2007 | Thiel et al. ............. | 297/216.12 |
| 2002/0093231 | A1 | * | 7/2002 | Estrada et al. ......... | 297/216.12 |
| 2004/0155496 | A1 | * | 8/2004 | Farquhar et al. ....... | 297/216.12 |
| 2006/0012226 | A1 | * | 1/2006 | Schafer et al. ......... | 297/216.12 |
| 2006/0071518 | A1 | * | 4/2006 | Hippel et al. .......... | 297/216.12 |
| 2006/0119150 | A1 | * | 6/2006 | Hoffmann .............. | 297/216.12 |
| 2006/0163919 | A1 | * | 7/2006 | Thiel et al. ............. | 297/216.12 |
| 2006/0163930 | A1 | * | 7/2006 | Pettersson et al. ........... | 297/408 |

(Continued)

FOREIGN PATENT DOCUMENTS

DE 101 38 248 12/2002

(Continued)

*Primary Examiner*—Peter R. Brown
(74) *Attorney, Agent, or Firm*—William L. Androlia; H. Henry Koda

(57) ABSTRACT

A movable headrest provided on a seat back of a seat mounted in a vehicle and capable of changing a position from a normal position to an emergency position, the headrest including a headrest support supported by the seat back and having a guide section, a rotary support member pivotally supported by the headrest support and rotatable between a first position corresponding to the normal position and a second position corresponding to the emergency position, and a headrest body pivotally supported by the rotary support member and having a headrest body support which moves along the guide section, whereby as the rotary support member rotates relative to the headrest support, the position of the headrest body relative to the headrest support changes while the headrest body support moves along the guide section.

8 Claims, 12 Drawing Sheets

U.S. PATENT DOCUMENTS

| | | | |
|---|---|---|---|
| 2007/0085400 A1* | 4/2007 | Terada et al. | 297/391 |
| 2007/0246989 A1* | 10/2007 | Brockman | 297/391 |
| 2008/0073950 A1* | 3/2008 | Ko | 297/216.12 |
| 2008/0073951 A1* | 3/2008 | Hattori et al. | 297/216.12 |
| 2008/0079294 A1* | 4/2008 | Humer et al. | 297/216.12 |

FOREIGN PATENT DOCUMENTS

| | | | |
|---|---|---|---|
| EP | 1 193 114 | | 4/2002 |
| EP | 1 705 057 | | 9/2006 |
| FR | 2 880 308 | | 7/2006 |
| JP | 2002-142910 | | 5/2002 |
| JP | 2006-511398 | | 4/2006 |
| JP | 2006-264431 | | 10/2006 |
| JP | 2007106384 | A * | 4/2007 |
| WO | WO 2004/056606 | | 7/2004 |

* cited by examiner

FIG. 1 (emergency portion = second portion)

FIG. 2 (normal portion = first portion)

FIG.7
(a)
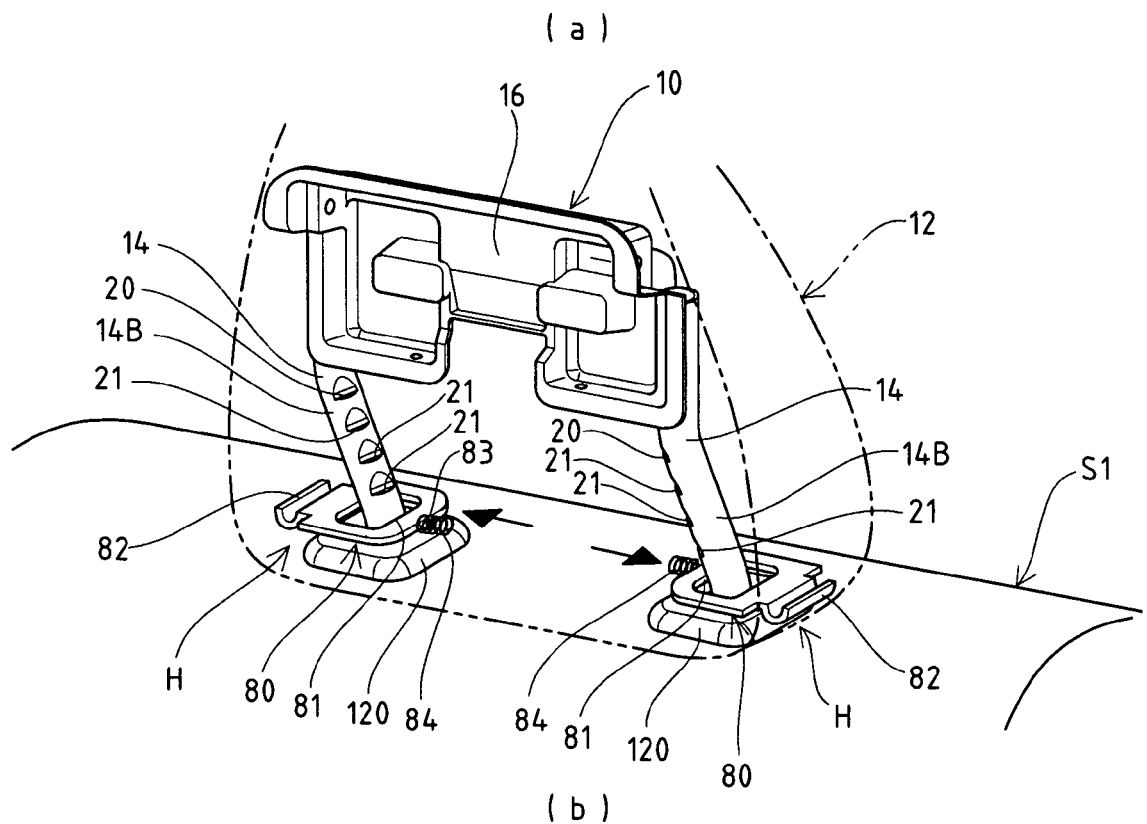
(b)
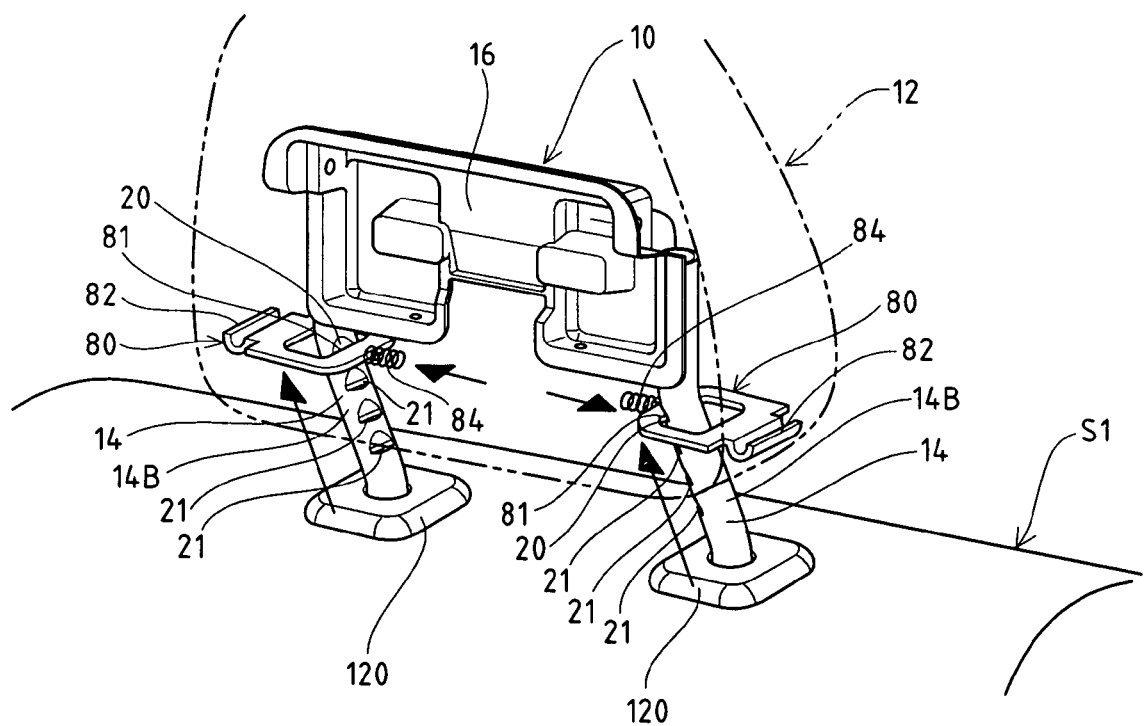

HEADREST

BACKGROUND OF THE INVENTION

1. Field of the Invention

The present invention relates to a headrest, and, more particularly, to a movable headrest which is provided on the seat back of a seat of a vehicle and changes its position from a normal position to an emergency position at the time of occurrence of a rear-end collision, thereby preventing the neck or so of a passenger from being damaged.

2. Description of the Related Art

A headrest is provided on an upper portion of the seat back of a seat of a vehicle to receive the head of a passenger including a driver when the vehicle is hit from behind, preventing a so-called whiplash injury. Recently, various kinds of movable headrests (also referred to as "active headrests") with an enhanced performance for protecting the head, neck etc. have been proposed. At the time of a rear-end collision, this movable headrest instantaneously changes the position of the headrest body which receives the head of a passenger frontward, thereby protecting the head, the neck or the like of the passenger.

The movable headrest generally includes a position changing mechanism which changes the position of the headrest body in a normal use position (hereinafter referred to as "normal position") to a desired position (hereinafter referred to as "emergency position") when a rear-end collision occurs. The movable headrest further includes a position hold mechanism which holds the headrest body, shifted to an emergency position, in the emergency position. The position hold mechanism prevents the headrest body, shifted to the emergency position by the impact of the collision, from reversely returning to the normal position, so that the headrest body can keep receiving the head of the passenger. Further, the movable headrest includes a position return mechanism which releases the holding of the position of the headrest body held by the position hold mechanism as needed. The position return mechanism permits the headrest body moved to the emergency position to return to the normal position. Movable headrests of this kind are disclosed in, for example, Japanese Unexamined Patent Publication No. 2002-142910 (Patent Document 1), Japanese Unexamined Patent Publication No. 2006-264431 (Patent Document 2), and Japanese PCT National Publication No. 2006-511398 (Patent Document 3).

The position changing mechanism of each of the movable headrests disclosed in Patent Document 1 and Patent Document 2 employs a link structure which has a plurality of arm-like link members coupled together. In the position changing mechanism, impact force generated when a head of the passenger hits against the headrest is directly applied to the individual link members. When impact force is applied to the headrest body from above or side, the individual link members receive the impact force, which may cause the problem of deformation or damage of the link members. When the link members are thus deformed or damaged, malfunction occurs in the operation of the position changing mechanism, so that the headrest body may not return to the original normal position.

The position hold mechanism of the movable headrest disclosed in Patent Document 3 further comprises a fan-shaped latch part which functions in association with the action of the headrest body, and a lever part which engages with the latch part. More specifically, the position hold mechanism of Patent Document 3 is configured in such a way that as the position of the headrest body changes, the latch part rotates and the headrest body changes its position to the emergency position, so that the latch part engages with the lever part to hold the headrest body in the emergency position. However, this position hold mechanism suffers upsizing of the fan-shaped latch part, the lever part, etc., which leads to upsizing of the entire headrest and an increase in the weight.

The movable headrest of Patent Document 3 is designed in such a way that, so as to return the headrest body, shifted to the emergency position, to the normal position, the hold state of the position hold mechanism is released by disengaging the latch part from the lever part by an exclusive reset tool prepared separately. Furthermore, when returning the headrest body, a worker needs to return the headrest body to the normal position with one hand while disengaging the latch part from the lever part by means of the reset tool held by the other hand. Therefore, the work of returning the headrest body is very troublesome. In addition, because the latch part and the lever part are provided inside the headrest body, the worker cannot disengage both parts from each other without the reset tool in hand, disabling returning of the headrest body to the normal position.

As mentioned above, each of the conventional movable headrests incorporates the position changing mechanism, the position hold mechanism, the position return mechanism and so forth, so that the increased number of components leads to upsizing, weight increase and cost increase of the headrest. To avoid upsizing of the conventional movable headrests, various headrests have been proposed in which typically, the headrest constituting members are divided into front and rear parts. However, the dividable type headrest has a parting line formed on its outer design surface, and is inferior from the design point of view. Further, the dividable type headrest may suffer a foreign object entering the inside from the boundary portion of the divided headrest constituting members, interfering with the operation of each mechanism. Therefore, the dividable type headrest needs an additional member, such as a cover, to prevent penetration of foreign objects, leading to a further cost increase.

SUMMARY OF THE INVENTION

Accordingly, it is an object of the present invention to provide a headrest in which a position changing mechanism that changes the position of a headrest body from a normal position to an emergency position, and a position hold mechanism that holds the headrest body in the emergency position have simple structures, and in which size reduction, weight reduction, cost down and improvements in the design and operability are accomplished.

To achieve the object, the present invention provides a movable headrest provided on a seat back of a seat mounted in a vehicle and capable of changing a position from a normal position to an emergency position, and the headrest of the present invention includes:

a headrest support supported by the seat back and having a guide section;

a rotary support member pivotally supported by the headrest support and rotatable between a first position corresponding to the normal position and a second position corresponding to the emergency position; and a headrest body pivotally supported by the rotary support member and having a headrest body support which moves along the guide section, whereby as the rotary support member rotates relative to the headrest support, a position of the headrest body relative to the headrest support changes while the headrest body support moves along the guide section.

BRIEF DESCRIPTION OF THE DRAWINGS

FIG. 7A is a perspective view showing the positions of each lock plate when the headrest body is in the normal position, and FIG. 7B is a perspective view showing the headrest body shifted to the emergency position so that each lock plate is engaged with a corresponding second engagement recess portion;

DETAILED DESCRIPTION OF THE PREFERRED EMBODIMENT

A headrest according to the present invention will now be described by way of a preferred embodiment referring to the accompanying drawings. In the embodiment, the side which receives the head of a passenger (which is frontward of a seat S and on the left side in FIG. 11) is the front side of a headrest HR.

Figure 11:
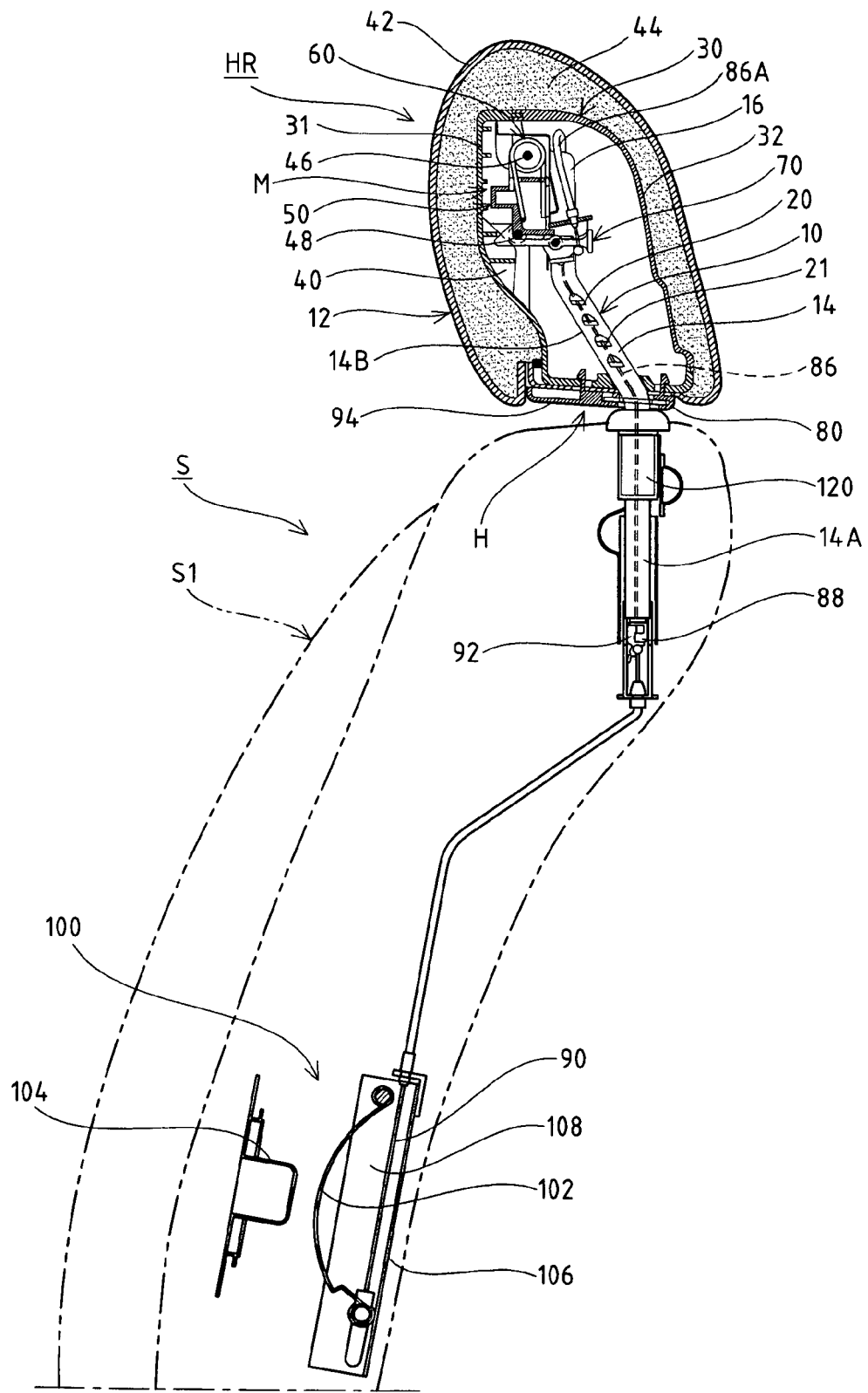
FIG. 11 is a vertical cross-sectional side view showing the headrest mounted to a seat back.
Figure 12:
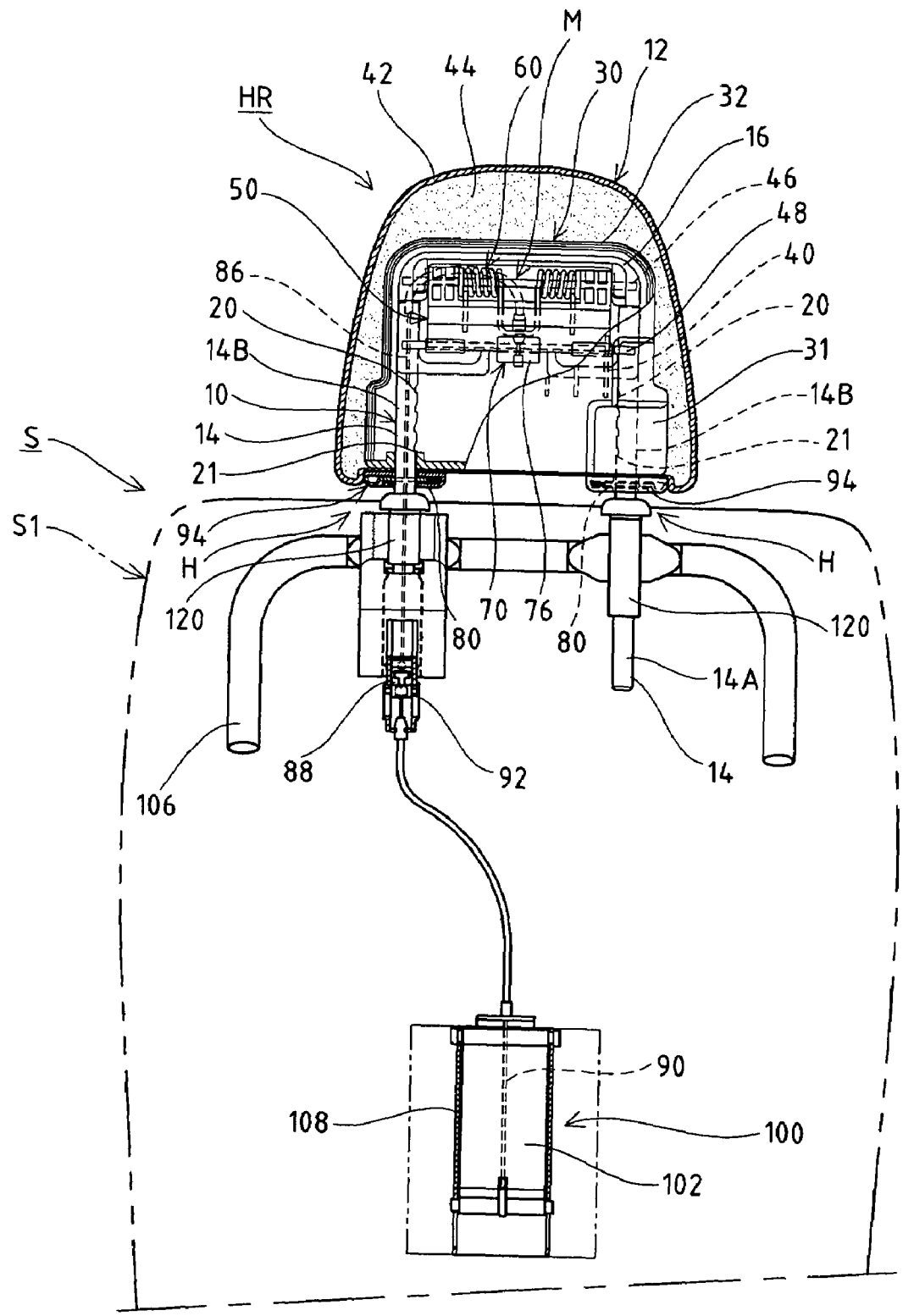
FIG. 12 is a vertical cross-sectional front view showing the headrest mounted to the seat back.

As shown in FIGS. 11 and 12, the headrest HR of the embodiment is mounted in a seat back S1 as support stays 14 are fitted from above into stay support members 120 which are open in the top surface of the seat back S1. The headrest HR is mechanically coupled to a pressure receiving mechanism (rear-end collision detecting means) 100 disposed inside the seat back S1, as will be described later. When a rear-end collision of a vehicle presses the passenger against the seat back S1 and applies pressure to the pressure receiving mechanism 100, the headrest HR changes its position from a normal position indicated by a two-dot chain line in FIG. 1 to an emergency position indicated by a solid line.

Figure 2:
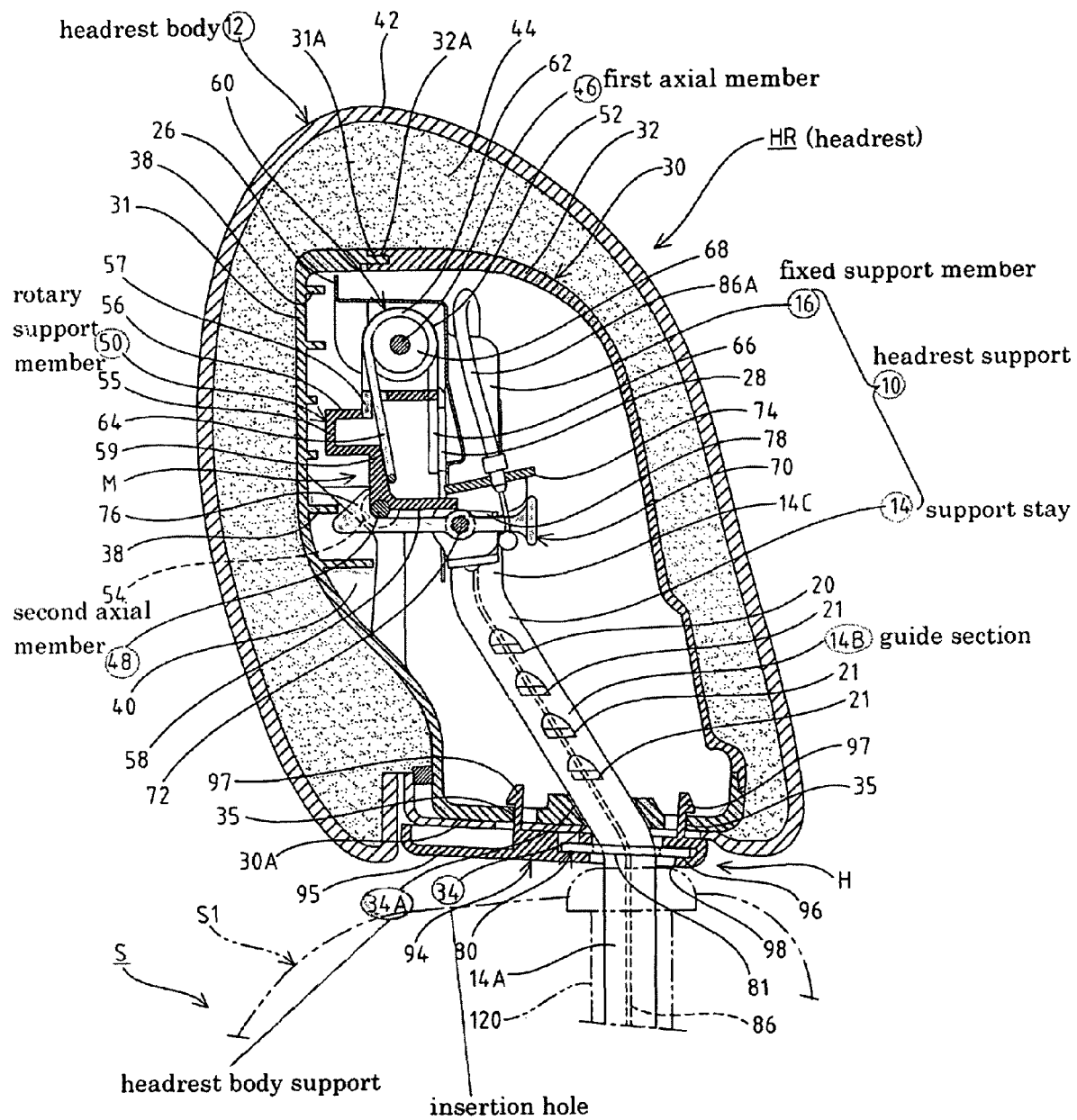
FIG. 2 is a vertical cross-sectional side view showing the headrest held in a normal position.
Figure 3:
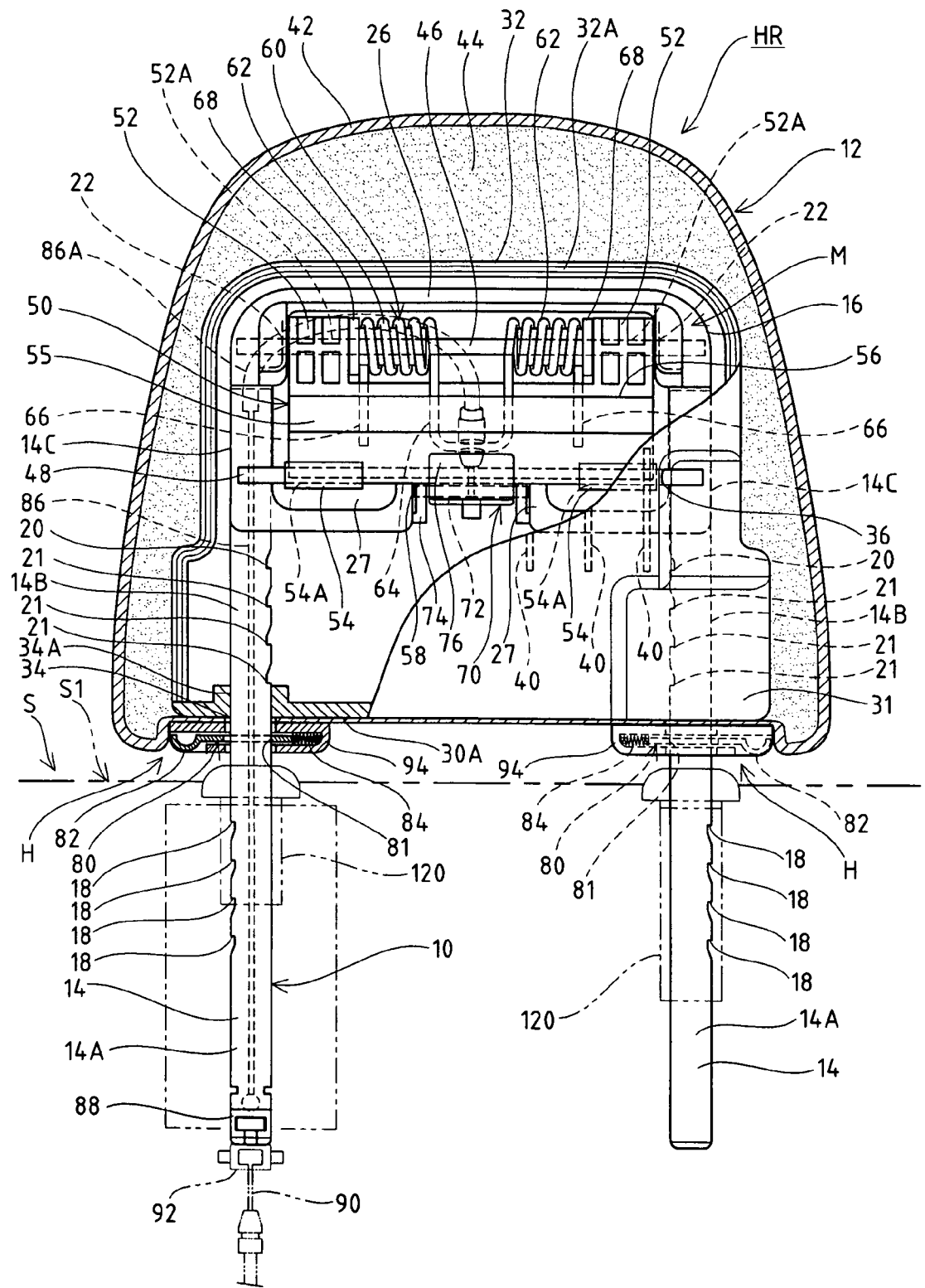
FIG. 3 is a vertical cross-sectional front view showing the headrest held in the normal position.

As shown in FIGS. 2 and 3, the headrest HR has a headrest support 10, which is supported by the seat back S1 via the support stays 14, and a headrest body 12, which is disposed on the headrest support 10. The headrest body 12 is coupled to a fixed support member 16, which is a part of the headrest support 10, via a rotary support member 50 of a position changing mechanism M to be described later. The headrest body 12 includes a headrest body support 34A that is provided in a slidable fashion with respect to the support stays 14 constituting the headrest support 10. Therefore, as the rotary support member 50 rotates, the headrest body 12 slides along the support stays 14 to change the position to the emergency position from the normal position.

Figure 4:
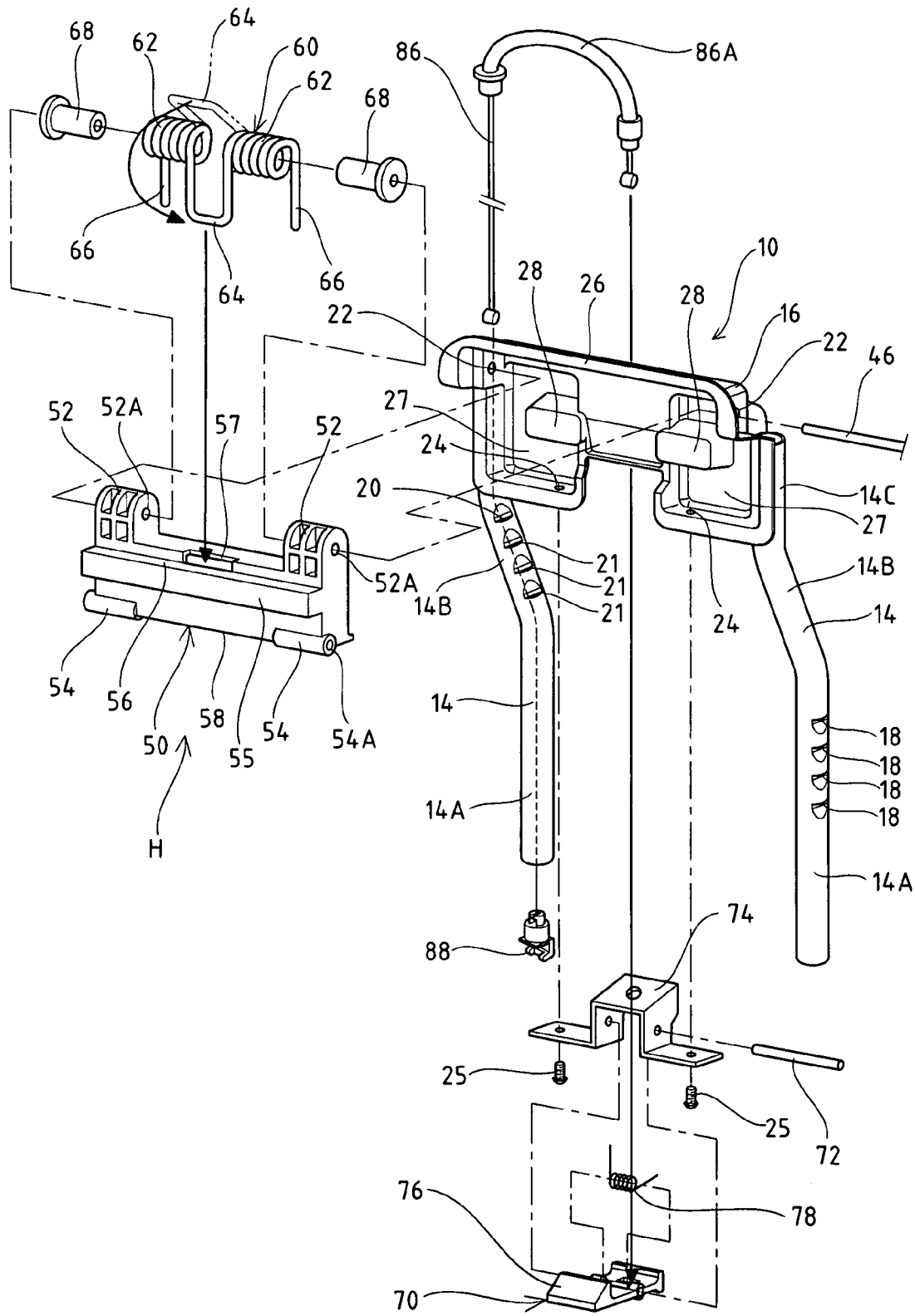
FIG. 4 is a perspective view showing the manner of assembling a headrest support, a rotary support member and a lock member.
Figure 5:
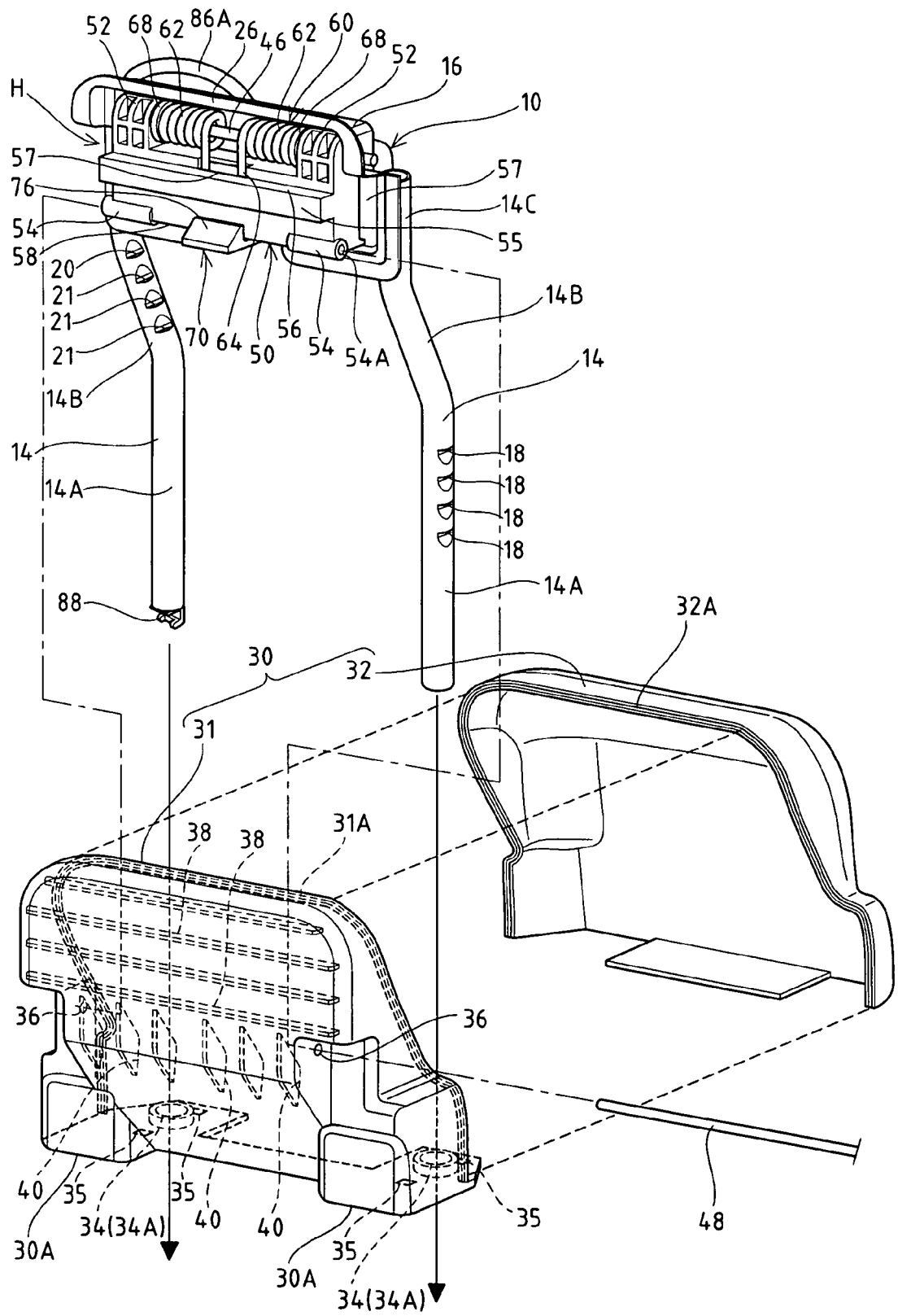
FIG. 5 is a partly exploded perspective view showing the manner of attaching a headrest core to the headrest support.

As shown in FIGS. 4 and 5, the headrest support 10 has the two support stays 14 hanging down at both sides of the fixed support member 16 made of steel. Each support stay 14 is comprised of a lower support portion 14A, which is to be fitted in the stay support member 120 described above, a middle support portion 14B (guide section), which is inclined frontward with respect to the seat back S1 at a predetermined angle from the upper end of the lower support portion 14A toward an upper portion thereof, and an upper support portion 14C, which extends substantially vertically upward from the upper end of the middle support portion 14B and is to be fixed to the fixed support member 16. The support stay 14 can be a single member obtained by bending one pipe member into an approximately U shape.

As shown in FIGS. 3 and 4, four first engagement recess portions 18 are formed in the lower support portion 14A of the support stay 14 at predetermined intervals in the lengthwise direction of the support stay 14. Each first engagement recess portion 18 has a notch shape having an upper engagement step and a lower inclined surface. The first engagement recess portions 18 engage the engagement projections (not shown) provided in the stay support member 120 so that the height position of the headrest HR to the seat back S1 is adjusted.

Figure 1:
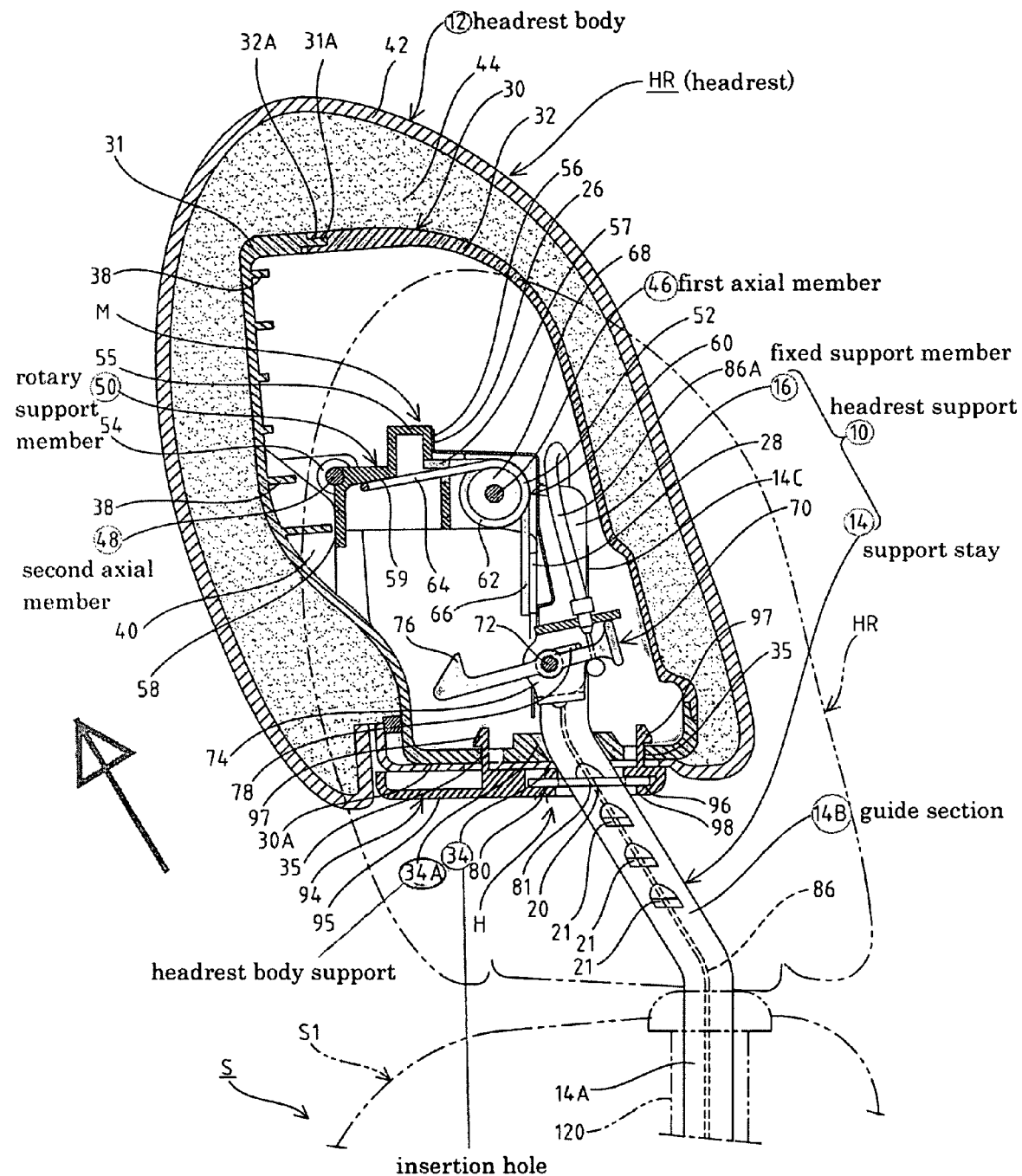
FIG. 1 is a vertical cross-sectional side view showing a headrest according to the present invention shifted to an emergency position.

As shown in FIGS. 3 and 7, one second engagement recess portion 20 and three third engagement recess portions (third engagement portions) 21 are inwardly formed in the face of the middle support portion 14B of the support stay 14 at predetermined intervals in the lengthwise direction. The second engagement recess portion 20 and the third engagement recess portions 21 constitute a position hold mechanism H to be described later. The second engagement recess portion 20 and third engagement recess portions 21 each have the same notch shape, with its inclined surface being opposite to that of the first engagement recess portion 18. Specifically, as seen from FIG. 8, the second engagement recess portion 20 and each of the three third engagement recess portions 21 respectively have an engagement step 20A, 21A on the lower side (tip side of the support stay 14) and an inclined portion (guide portion) 20B and 21B on the upper side (on the fixed support member 16 side). Lock plates (engagement members) 80 provided in the headrest support 10 engage the second engagement recess portion 20 and the third engagement recess portions 21 in a disengageable manner. As will be described later, at the time when the headrest body 12 moves from the normal position to the emergency position, the lock plate 80 slides and slidingly contacts the inclined portion 21B of the associated third engagement recess portions 21, thus permitting the movement of the headrest body 12 to the emergency position. When the passenger's head hits against the headrest body 12 during the movement of the headrest body 12 to the emergency position from the normal position, the lock plate 80 engages the engagement step 20A and 21A of the second engagement recess portion 20 or any one of the plurality of third engagement recess portions 21, restricting the reversion of the headrest body 12 to the normal position. As shown in FIG. 1, the second engagement recess portion 20 at the uppermost position of the support stay 14 is provided at a position where the engagement by the lock plate 80 is made, when the headrest body 12 changes its position to the emergency position.

As shown in FIGS. 3 and 4, the fixed support member 16 is formed by deep-drawing of, for example, a steel plate, and is provided with a flange along the outer periphery to have a strength and rigidity large enough not to be easily deformed by receiving the impact force. A pair of first support holes 22 with their axes aligned horizontally are bored in right and left upper wall portions of the fixed support member 16. A first axial member 46 is inserted and supported in the first support holes 22. Screw holes 24 are provided in the lengthwise direction in the right and left lower wall portions of the fixed support member 16, and screws 25 to fix a bracket 74 to the fixed support member 16 are respectively screwed into the screw holes 24 (FIG. 4). Further, a horizontally elongated flange portion 26 is formed at the front upper periphery of the fixed support member 16. As shown in FIG. 1, when the rotary support member 50 changes its position to a second position (to be described later), the flange portion 26 abuts on a first abutment face 56 of the rotary support member 50 to inhibit further rotation of the rotary support member 50. As shown in FIG. 4, recess portions 27 are formed at right and left portions of the fixed support member 16. Second arm portions 66 of a first torsion spring (rotating means) 60 to be described later are in abutment with and supported by projections 28 protruding frontward and adjacent to the respective recess portions 27.

As shown in FIGS. 1 to 3 and 5, the headrest body 12 comprises an outer skin 42, a headrest core 30 having a rigidity, and a foam 44 provided between the headrest core 30 and the outer skin 42. The headrest core 30 is an injection-molded article made of a synthetic resin, which comprises a front half body 31 located on the front side of the headrest HR and a rear half body 32 located on the rear side of the headrest HR. The headrest core 30 is hollow inside by assembling both half bodies 31 and 32 into a single piece. As shown in FIG. 5, a grooved fitting portion 32A is formed along the edge of the abutment portion of the rear half body 32, and a protruding fitting portion 31A is formed along the edge of the abutment portion of the front half body 31. When the grooved fitting portion 32A and the protruding fitting portion 31A are fitted together, the headrest core 30 is assembled without a gap along the boundary portion between the half bodies 31 and 32.

As shown in FIG. 5, insertion holes 34 through which the support stays 14 are to be inserted are respectively formed in the bottom wall portions 30A of the headrest core 30. An annular headrest body support 34A which moves along the middle support portion 14B of the support stay 14 is formed around each insertion hole 34. Second support holes 36 are formed in the vertical wall portions positioned at the right and left sides of the front half body 31. A second axial member 48 is inserted and supported in the second support holes 36 so as to rotatably and pivotally support the rotary support member 50. On the inner wall surface of the front wall portion of the front half body 31, a plurality of horizontal ribs 38 are vertically formed at predetermined intervals, and in addition a plurality of vertical ribs 40 are horizontally formed at predetermined intervals. This prevents the headrest body 12 from being deformed and damaged even when the head of the passenger hits against the headrest body 12. Each vertical rib 40 is configured to abut on a second abutment face 58 provided on the rotary support member 50 when the rotary support member 50 changes its position to the second position.

The outer skin 42 is made of a synthetic leather, fabric or the like, and is preferably of a material that is the same as that of the outer skin of the seat S and seat back S1. The foam 44 is obtained by foaming a foam material with the headrest core 30 and the outer skin 42 set in a foam mold (not shown). The headrest body 12 of the headrest HR thus has a structure in which the hollow headrest core 30 is covered with the foam 44 and outer skin 42. Because there is no gap along the boundary portion of the front half body 31 and the rear half body 32 of the headrest core 30, as mentioned above, the foam material does not leak into the headrest core 30 at the time that the foam 44 is foam-molded.

As shown in FIGS. 3 to 5, the rotary support member 50 constituting the position changing mechanism M is a single horizontally elongated member obtained by injection molding of a synthetic resin material. The rotary support member 50 is given a strength and rigidity large enough not to be deformed or damaged even when the impact force is received when the head of the passenger hits against the headrest HR. With the rotary support member 50 aligned with the front side of the fixed support member 16 (see FIGS. 2 and 3), an ear-like pair of support portions 52 are protrusively provided at right and left sides of the wall portion to be the top surface of the rotary support member 50. First through holes 52A through which the first axial member 46 is to be inserted are bored in both support portions 52 with the horizontal axial lines aligned with each other. Therefore, the rotary support member 50 is pivotally provided on the fixed support member 16 by the first axial member 46 that is inserted in both first through holes 52A. This allows the rotary support member 50 to be rotatable between the first position (FIGS. 2 and 3), which is aligned with the front face of the fixed support member 16, and the second position (FIG. 1), which is rotated about the first axial member 46 by approximately 90 degrees with respect to the fixed support member 16 to stick out forward. When the rotary support member 50 is in the first position, the headrest HR is in the normal position, and when the rotary support member 50 is moved to the second position, then the headrest HR is moved to the emergency position.

Figure 10:
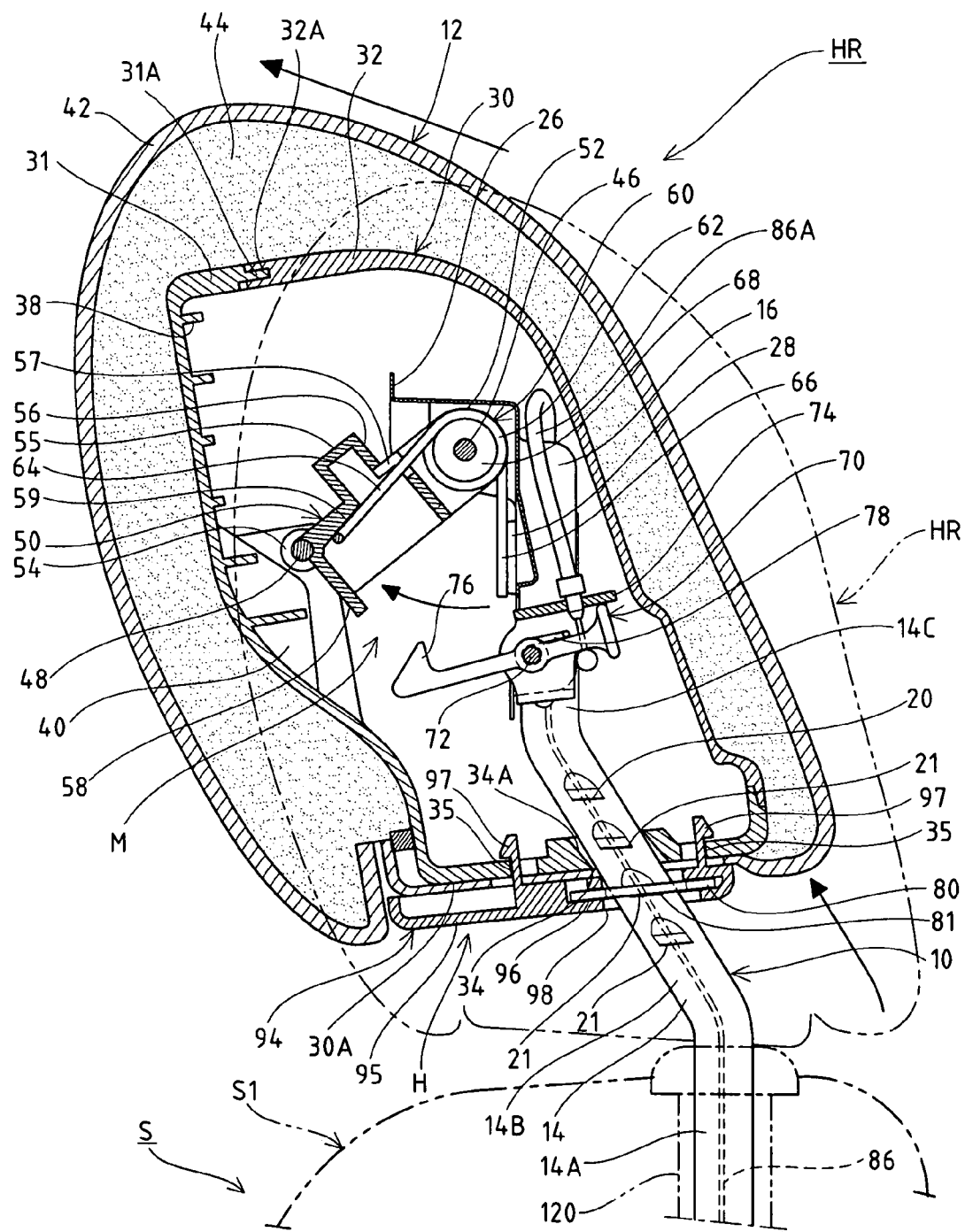
FIG. 10 is a vertical cross-sectional side view showing the headrest body at the middle of the normal position and the emergency position.

As shown in FIG. 4, a pair of boss portions 54 are formed on the front face of both lower side portions of the rotary support member 50. Second through holes 54A through which the second axial member 48 is to be inserted are respectively bored in both boss portions 54. The rotary support member 50 is pivotally supported by the front half body 31 of the headrest core 30 via the second axial member 48 inserted in the second through holes 54A, to be rotatable with respect to the headrest body 12. The second axial member 48 is disposed at a predetermined axial distance from the first axial member 46. When the rotary support member 50 is at the first position, as shown in FIG. 2, the second axial member 48 is positioned approximately below the first axial member 46. At the time when the rotary support member 50 rotates to the second position from the first position, as shown in FIG. 10, the second axial member 48 moves frontward and upward along an arcuate locus about the first axial member 46. When the rotary support member 50 is in the second position, as shown in FIG. 1, the second axial member 48 is positioned substantially horizontally frontward of the first axial member 46.

As shown in FIG. 4, a projection 55 extending right and left is protrusively provided on the front face portion of the rotary support member 50 locating in the first position. The top face of the projection 55 makes the first abutment face 56 as shown in FIG. 1. The first abutment face 56 abuts on the flange portion 26 of the fixed support member 16 when the rotary support member 50 is in the second position. The bottom face portion of the rotary support member 50 locating the first position makes the second abutment face 58 as shown in FIG.

1. The second abutment face 58 abuts on the vertical ribs 40 formed in the front half body 31 of the headrest core 30 when the rotary support member 50 is in the second position.

As shown in FIGS. 1 to 5, a first torsion spring (rotating means) 60 of a double torsion type which rotates the rotary support member 50 to the second position from the first position is disposed on the first axial member 46. As indicated by a two-dot chain line in FIG. 4, the first torsion spring 60 is configured so that in a loadless state the first arm portion 64, which is at the center and connects both torsion portions 62 together, is spread by 90 degrees or greater with respect to the second arm portions 66 that extend from both ends of the torsion portions 62. As indicated by a solid line in FIG. 4, when the tip portion of the first arm portion 64 is pressed downward, both torsion portions 62 are elastically deformed to come to the positions directed in approximately the same directions as the second arm portions 66. The first torsion spring 60 is provided on the first axial member 46 via spacers 68, which are respectively inserted in the torsion portions 62, between the support portions 52 of the rotary support member 50. As shown in FIGS. 2 and 4, the first arm portion 64 is inserted in an opening 57 formed in the rotary support member 50 and abuts on the inner abutment portion 59 of the rotary support member 50.

The second arm portions 66 of the first torsion spring 60 abut on the respective projections 28 formed on the fixed support member 16; accordingly, the rotary support member 50 attached to the fixed support member 16 via the first axial member 46 is held at the second position in an elastically urged state. Therefore, when the rotary support member 50 in the second position is moved to the first position, the first arm portion 64 of the first torsion spring 60 is shifted to a position indicated by the solid line in FIG. 4. As is apparent from the above, the position changing mechanism M is set so that when the rotary support member 50 is in the first position, the return elastic force of the first torsion spring 60 becomes maximum. In other words, the rotary support member 50 in the first position is always elastically urged toward the second position by the first torsion spring 60.

As shown in FIGS. 1 to 3, a lock member 70 which serves as engagement holding means is disposed at a lower middle portion of the fixed support member 16. The lock member 70 engages and holds the rotary support member 50 in the first position, and is mechanically coupled to the pressure receiving mechanism 100 via a first wire 86 and a second wire 90 as shown in FIG. 11. The lock member 70 is attached in a rockable manner to the bracket 74, which is secured to the fixed support member 16, by a third axial member 72 provided in a right and left direction at an approximately center portion in the longitudinal direction. A hook portion 76 protruding upward is formed at the front end portion of the lock member 70. Therefore, at a first state where the lock member 70 is approximately horizontal (FIG. 2), the hook portion 76 of the lock member 70 is locked at the lower end portion of the rotary support member 50 which is in the first position. At a second state where the lock member 70 is inclined frontward and downward (FIGS. 1 and 10), the hook portion 76 is unlocked from the rotary support member 50. In other words, when the lock member 70 is shifted to the second state and unlocked from the rotary support member 50, the rotary support member 50 rotates to the second position by the urging force of the first torsion spring 60. In the above structure, as shown in FIG. 4, a second torsion spring 78 is disposed over the third axial member 72, and the lock member 70 is normally elastically urged toward the first state thereby.

Next, the position hold mechanism H which restricts reversion of the headrest body 12 to the normal position when the headrest body 12 moves to the emergency position from the normal position will be described. The position hold mechanism H provided at the headrest HR comprises the lock plates (engagement members) 80 provided on the outer bottom surface of the headrest body 12, the second engagement recess portions 20 and the third engagement recess portions 21 provided in the support stays 14, as shown in FIGS. 2 and 3. An edge engagement portion (first engagement section) 81 of the lock plate 80 provided on the headrest body 12 engages, in a disengageable manner, the second engagement recess portion 20 or the third engagement recess portions 21 provided in each support stay 14. When the edge engagement portion 81 of the lock plate 80 engages the second engagement recess portion 20 or the third engagement recess portions 21, the headrest body 12 is held so that the headrest body 12 does not return to the normal position.

Figure 6:
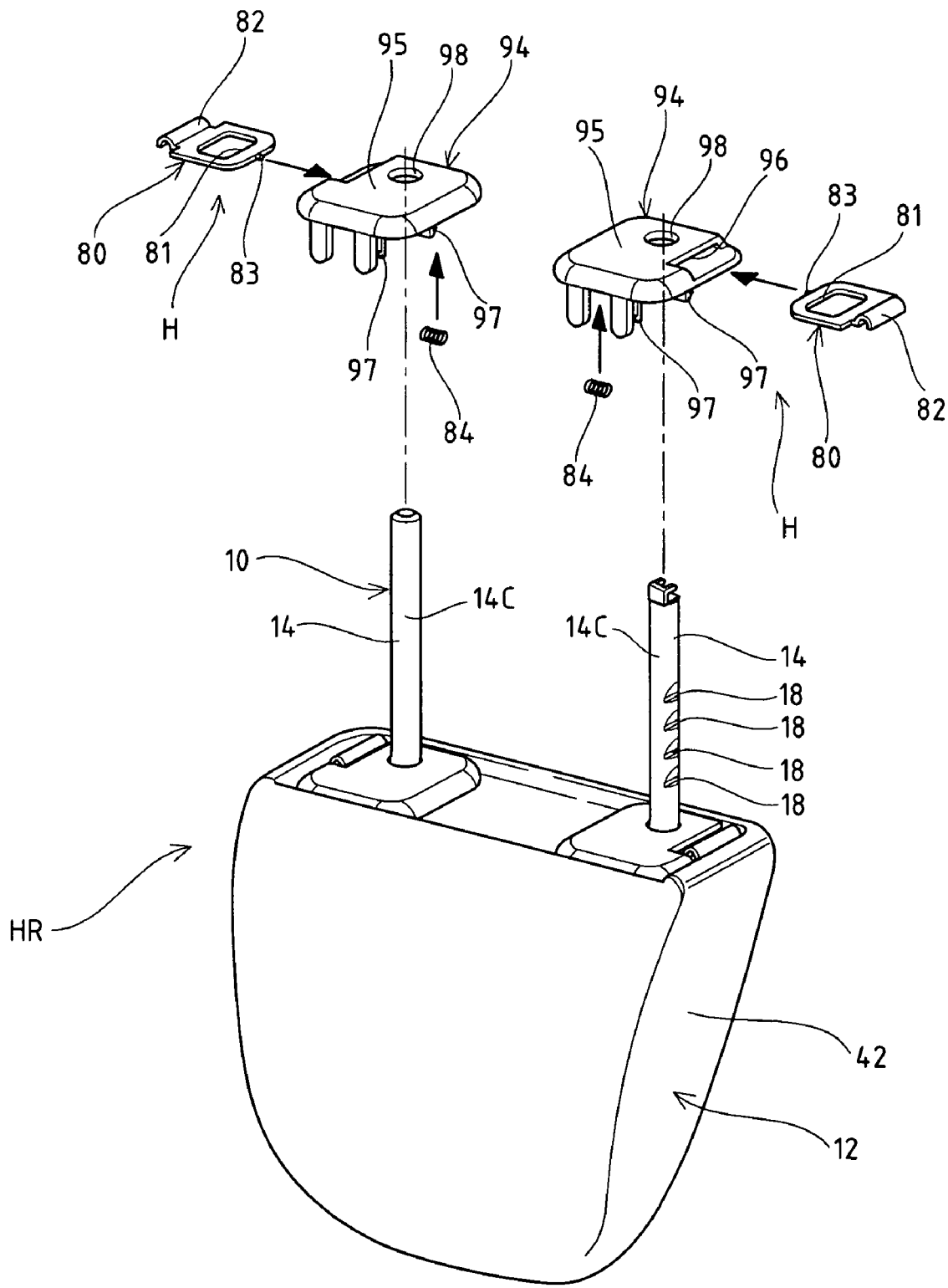
FIG. 6 is an inverted perspective view of a headrest body, showing the assembly relationship between lock plates of brackets to be fixed to the headrest body and a compression coil spring.

As shown in FIGS. 6 and 7, each lock plate 80 is a rectangular frame made of a metal material (steel, stainless, or the like) having an opening formed in the center where the support stay 14 is to be inserted. The edge engagement portion 81 which contacts the support stay 14 inserted into the opening of the lock plate 80 is formed at one inner edge portion of the opening of each lock plate 80. An operation section 82 for a slide operation is provided on the outer edge portion of each lock plate 80 so that the operation section 82 is at the opposite portion to the portion where the edge engagement portion 81 is formed. Further, a stop pin 83 for stopping a compression coil spring (urging member) 84 to be described later is protrusively provided on the outer edge portion of the position where the edge engagement portion 81 of the lock plate 80 is formed.

Figure 8:
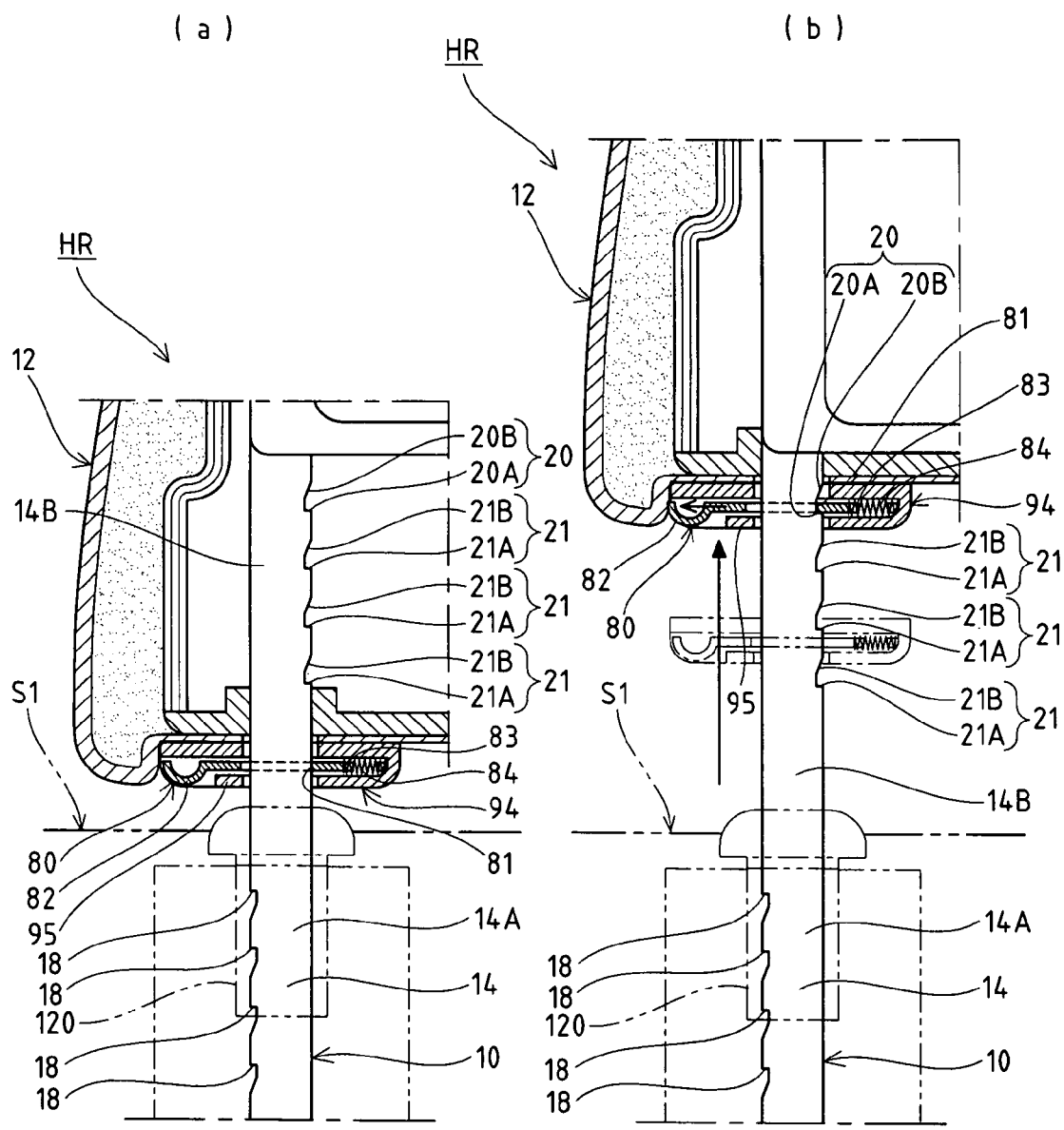
FIG. 8A is a partly cross-sectional enlarged view of FIG. 7A.
FIG. 8B is a partly cross-sectional enlarged view of FIG. 7B.

Each lock plate 80 is attached to a respective bracket 94 fixed to the outer bottom surface of the headrest body 12. The bracket 94 has a plate arrangement portion 96 at the back (the side facing the headrest body 12) of a rectangular member body 95 as shown in FIGS. 6 and 8, so that the lock plate 80 is provided in a slidable manner. Engagement claws 97 engageable with engagement holes 35 formed in the bottom wall portions 30A of the headrest core 30 are provided upright at a predetermined interval at the back of the member body 95 on both front and rear sides sandwiching the plate arrangement portion 96. A stay through hole 98 where the support stay 14 is to be inserted is formed in the member body 95 of each bracket 94 at a position corresponding to the plate arrangement portion 96. Therefore, with the support stay 14 inserted in the stay through hole 98, each bracket 94 is secured to the headrest body 12 (bottom wall portion 30A of the headrest core 30), catching the outer skin 42, by forcibly thrusting each engagement claw 97 into the respective engagement hole 35.

When the lock plate 80 is attached to the plate arrangement portion 96 of the bracket 94, as shown in FIGS. 2, 3 and 8, the opening of the lock plate 80 is aligned with the stay through hole 98 of the member body 95 to expose the operation section 82 of the lock plate 80 outward through a side opening portion of the member body 95. The lock plate 80 is normally elastically urged toward the side where the operation section 82 is formed by the compression coil spring 84 disposed between the stop pin 83 and the member body 95. In other words, the lock plate 80 disposed in the bracket 94 that is secured on the right side (left side in FIG. 3) of the headrest body 12 is elastically urged rightward (leftward in FIG. 3) of the headrest body 12. The lock plate 80 disposed in the bracket 94 that is secured on the left side (right side in FIG. 3) of the headrest body 12 is elastically urged leftward (rightward in FIG. 3) of the headrest body 12. Each lock plate 80 is prevented from coming off the plate arrangement portion 96 by a stop means, which is not shown in the drawings.

Figure 9:
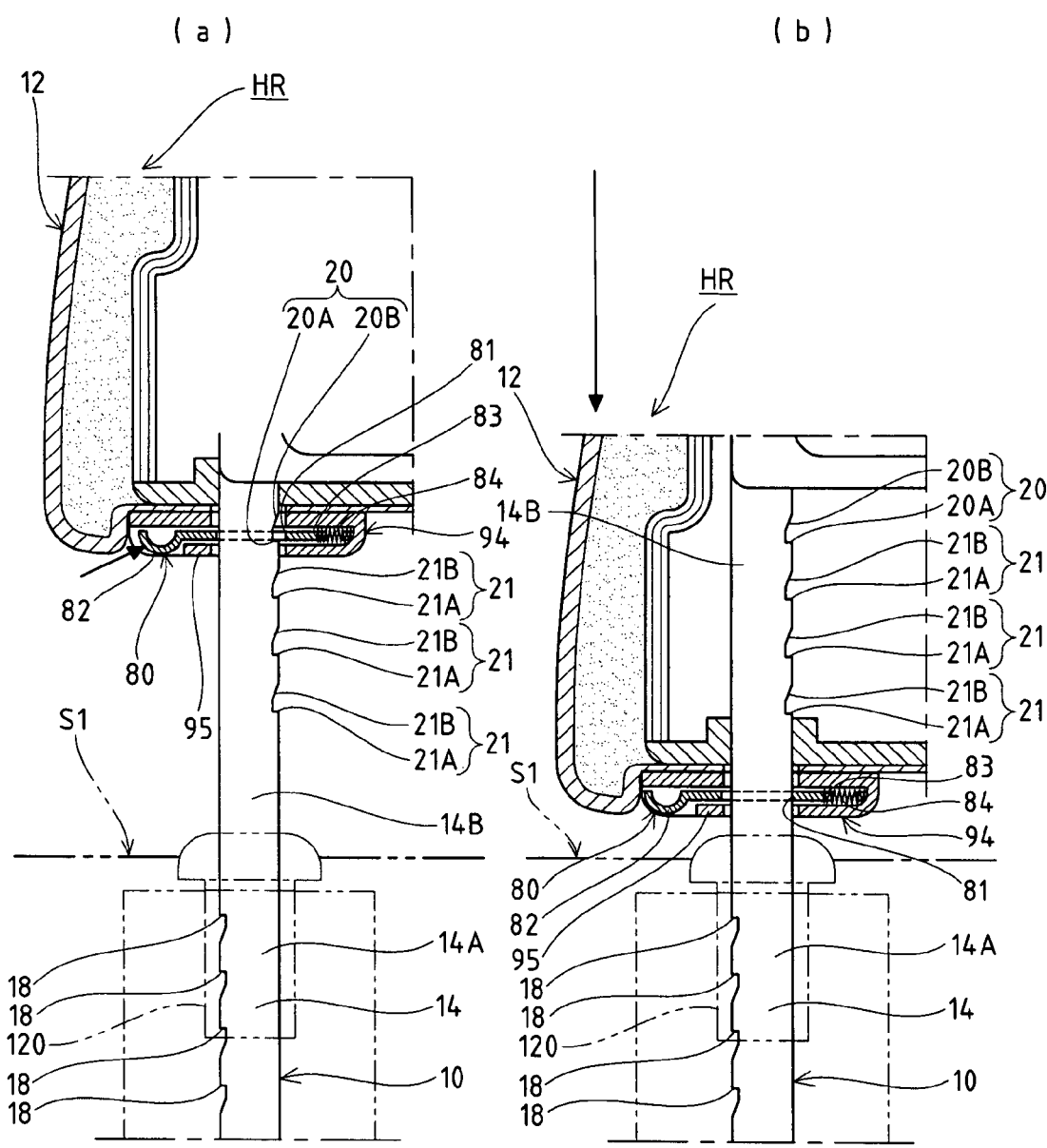
FIG. 9A is a partly cross-sectional enlarged view showing the lock plate moved to disengage an edge engagement portion thereof from the second engagement recess portion.
FIG. 9B is a partly cross-sectional enlarged view showing the headrest body returned to the normal position.

As described above and as shown in FIGS. 8 and 9, the single second engagement recess portion 20 formed in the support stay 14 as the position hold mechanism H has the engagement step 20A located on the side of the third engagement recess portions 21 and substantially perpendicular to the stay outer surface. The second engagement recess portion 20 further has the inclined portion 20B located on the side of the fixed support member 16 and inclined (inclined upward) in the direction of the fixed support member 16 from the deep inside of the engagement step 20A. On the other hand, the three third engagement recess portions 21 formed in the support stay 14 has the engagement step 21A located on the side of the tip portion of the support stay 14 and substantially perpendicular to the stay outer surface. Each third engagement recess portion 21 further has the inclined portion 21B located on the side of the second engagement recess portion 20 and inclined (inclined upward) in the direction of the second engagement recess portion 20 from the deep inside of the engagement step 21A. Each one of the inclined portions 20B and 21B is inclined at an angle of 20 to 30 degrees to the stay outer surface of the support stay 14 and has a flat surface.

Therefore, since the edge engagement portion 81 slides and abuts on the inclined portion 21B of each third engagement recess portions 21 at the time when the lock plate 80 elastically urged toward the support stay 4 moves upward (toward the fixed support member 16) from the lower position (or from the tip of the support stay 14), the position hold mechanism H allows the lock plate 80 to pass in each of the third engagement recess portions 21 upward. As a result, when a rear-end collision occurs, the headrest body 12 interlocked with the position changing mechanism M is permitted to move toward the emergency position from the normal position. Conversely, at the time when the lock plate 80 elastically urged toward the support stay 4 moves downward (toward the tip of the support stay 14) from the upper position (or from the second engagement recess portion 20), the edge engagement portion 81 engages with the engagement step 20A, 21A of the second engagement recess portion 20 or the third engagement recess portion 21. This, however, doesn't allow the lock plate 80 to pass in the second engagement recess portion 20 and each third engagement recess portions 21 downward. Therefore, when the head of the passenger hits against the headrest body 12 which is between the normal position and the emergency position, the lock plate 80 is engaged with any one of the third engagement recess portions 21, thus restricting the reversion of the headrest body 12 to the normal position. When the head of the passenger hits against the headrest body 12 which is in the emergency position, the lock plate 80 is engaged with the second engagement recess portion 20, thus preventing the headrest body 12 from returning to the normal position.

The position hold mechanism H of the embodiment described above can disengage the lock plate 80 from the second engagement recess portion 20 without using a separate reset tool. Specifically, as shown in FIG. 9A, when operation section 82 exposed through the bracket 94 is pressed toward the support stay 14 by a finger, each lock plate 80 slides in the direction where the compression coil spring 84 is disposed. When the lock plate 80 thus slides, the edge engagement portion 81 is separated from the second engagement recess portion 20 of the support stay 14, disengaging the edge engagement portion 81 from the second engagement recess portion 20. Therefore, with the operation sections 82 of both lock plates 80 being pressed with fingers at the same time, when the headrest body 12 is pressed backward toward the normal position, the headrest body 12 is able to return to the normal position.

As shown in FIGS. 3 and 12, the first wire 86 to be coupled to the second wire 90 extending from the pressure receiving mechanism 100 is inserted inside the support stay 14 disposed on the left side of the headrest HR. One end of the first wire 86 is coupled to a first joint block 88 disposed at the tip of the support stay 14. The other end of the first wire 86 extends from the upper end of the support stay 14 and is inserted in the bracket 74 and is then coupled to the portion of the lock member 70 rearer than the third axial member 72. The portion between the support stay 14 and the bracket 74 of the first wire 86 extending from the support stay 14 is covered with a tube 86A, and the first wire 86 is guided by the tube 86A.

As shown in FIGS. 11 and 12, one end of the second wire 90 installed in the seat back S1 is coupled to the lower end portion of a pressure receiving plate 102 of the pressure receiving mechanism 100, while the other end of the second wire 90 is coupled to a second joint block 92 disposed at the lower end of the stay support member 120. The first joint block 88 and the second joint block 92 are coupled together when the support stays 14 are fitted into the corresponding stay support members 120 at the time of mounting of the headrest HR to the seat back S1. The first joint block 88 and the second joint block 92 are disconnected from each other when the support stays 14 are pulled out of the respective stay support members 120 at the time of removing of the headrest HR from the seat back S1. In other words, the second wire 90 and the first wire 86 are coupled together and separated via the first joint block 88 and the second joint block 92. Therefore, the pressure receiving plate 102 of the pressure receiving mechanism 100 and the lock member 70 are mechanically coupled together via the second wire 90 and the first wire 86 that are coupled together by the joint blocks 88 and 92.

As shown in FIGS. 11 and 12, the pressure receiving mechanism 100 provided in the seat back S1 comprises the pressure receiving plate 102 disposed on a seat frame 106, and an abutment member 104 disposed on a cushion member so as to face the pressure receiving plate 102. The pressure receiving plate 102 is formed so that it is in a curved shape protruding toward the abutment member 104 when it is in an unloaded state. The pressure receiving plate 102 has an upper end portion secured to the bracket 108 that is fixed to the seat frame 106, and its lower end portion to which the second wire 90 is coupled is left unsecured (thus forming a free end).

The abutment member 104 is a block-like member disposed at a proper distance from the pressure receiving plate 102. The abutment member 104 is set so as not to contact the pressure receiving plate 102 in a normal condition where the passenger merely leans against the seat back S1. When the vehicle is hit from behind and the passenger is pressed against the seat back S1, the abutment member 104 strikes the curved pressure receiving plate 102, deforming the pressure receiving plate 102 into approximately a straight shape. As a result, when a rear-end collision presses the passenger against the seat back S1, the lower end portion of the pressure receiving plate 102 moves downward to pull the second wire 90 downward and further pull the first wire 86 on the headrest HR side which is coupled to the second wire 90. Then, when the first wire 86 is thus pulled, the lock member 70 changes from the first state (FIG. 2) to the second state (FIGS. 1 and 10), disengaging the lock member 70 from the rotary support member 50.

The action of the headrest according to the embodiment with the above-described structure will be described below. In a normal state, the headrest body 12 is held at the normal position, as shown in FIGS. 2, 3, 11 and 12. In other words, the rotary support member 50 is locked at the first position by the lock member 70, and thus the headrest body 12 is held at the normal position. The lock member 70 is coupled to the pressure receiving plate 102 of the pressure receiving mechanism 100 via the first wire 86, the second joint block 92, the first joint block 88 and the first wire 86.

As shown in FIGS. 2, 3, 7A and 8A, the support stay 14 is in the opening of the lock plate 80 disposed at each bracket 94. When the headrest body 12 is in the normal position, each lock plate 80 is positioned closer to the tip side (lower end side) of the support stay 14 than the third engagement recess portions 21 formed on the tip end side (lower end side) of the support stay 14. Therefore, while the edge engagement portion 81 is elastically urged to abut on the outer surface of the support stay 14 by the compression coil spring 84, each lock plate 80 is not in engagement with the second engagement recess portion 20 nor with the third engagement recess portions 21.

When a rear-end collision to the vehicle occurs and the passenger is pressed hard against the seat back S1, the abutment member 104 of the pressure receiving mechanism 100 strikes the pressure receiving plate 102, deforming the pressure receiving plate 102. When the pressure receiving plate 102 is deformed, the second wire 90 and the first wire 86 coupled by the first joint block 88 and the second joint block 92 are pulled in the direction of (or toward) the pressure receiving plate 102. When the first wire 86 is pulled in the direction of the pressure receiving plate 102, the lock member 70 urged into the first state by the second torsion spring 78 changes its state to the second state, overcoming the urging force of the second torsion spring 78. When the lock member 70 completes its changes into the second state, the lock member 70 is disengaged from the rotary support member 50.

As shown in FIG. 10, the urging force of the first torsion spring 60 causes the rotary support member 50 disengaged from the lock member 70 to rotate about the first axial member 46 toward the second position from the first position right away. The rotation of the rotary support member 50 causes the second axial member 48, which pivotally supports the rotary support member 50 and the headrest core 30, to move frontward approximately horizontally from approximately perpendicularly below the first axial member 46 along the arcuate locus about the first axial member 46, thereby defining the moving locus of the upper portion of the headrest body 12. The rotation of the rotary support member 50 causes each headrest body support 34A provided at the lower portion of the headrest core 30 to move upward along the middle support portion 14B of each support stay 14, thereby defining the moving locus of the lower portion of the headrest body 12. In other words, the movement of the second axial member 48 and the movement of the headrest body support 34A along the support stay 14, according to the rotation of the rotary support member 50 from the first position to the second position causes the headrest body 12 to move upward toward the emergency position in a forward-inclined state.

As shown in FIGS. 7B, 8B and 10, when headrest body 12 changes its position from the normal position to the emergency position, each lock plate 80 sequentially passes the third engagement recess portions 21 from below. At this time, the urging force of the compression coil spring 84 causes each lock plate 80 to move upward in contact with the outer surface of the support stay 14, so that each lock plate 80 slides and abuts on the inclined portion 21B at the time of passing each third engagement recess portion 21. Therefore, since each lock plate 80 passes without engaging any of the third engagement recess portions 21, the headrest body 12 moves to the emergency position from the normal position.

When the rotary support member 50 rotates to the second position, as shown in FIG. 1, the first abutment face 56 of the rotary support member 50 abuts on the flange portion 26 of the fixed support member 16 to restrict the rotation of the rotary support member 50. When the rotary support member 50 rotates to the second position, the vertical ribs 40 formed in the headrest core 30 abut on the second abutment face 58 of the rotary support member 50. Then, as shown in FIGS. 1, 7B and 8B, when the headrest body 12 comes to the emergency position, the lock plate 80 is aligned with the second engagement recess portion 20, and the edge engagement portion 81 of the lock plate 80 elastically urged by the compression coil spring 84 is engaged with the engagement step 20A of the second engagement recess portion 20. Therefore, when the headrest body 12 stops at the emergency position, the lock plate 80 engages with the second engagement recess portion 20 to restrict the movement of the headrest body 12 toward the normal position, so that the headrest body 12 receives the head of the passenger while being held in the emergency position.

As shown in FIG. 1, in the headrest HR of the embodiment, when the headrest body 12 changes its position to the emergency position, the second abutment face 58 of the rotary support member 50 provided in the headrest body 12 comes in plane contact with the respective vertical ribs 40 formed on the front half body 31. Also when the headrest body 12 changes its position to the emergency position, the first abutment face 56 of the rotary support member 50 comes in plane contact with the flange portion 26 of the fixed support member 16 of the headrest support 10. Therefore, when the headrest body 12 receives the head of the passenger, the impact force hardly acts on the first axial member 46 and the second axial member 48, and the first axial member 46 and the second axial member 48 are prevented from being damaged.

Because the rotary support member 50 is a single member, the headrest HR of the embodiment has rigidity against the stress applied by the impact-force originated load. Further, the headrest body supports 34A provided at the lower portion of the headrest core 30 are in contact with the middle support portions 14B of the corresponding support stays 14. Therefore, even when the head of the passenger hits against the headrest body 12 from frontward, obliquely frontward or obliquely upward, or even when the head of the passenger hits against the headrest body 12 from obliquely downward, the collision-originated impact force is received by the support stays 14 via the headrest body supports 34A.

Meanwhile, due to a difference in build and sitting state of individual passengers sitting on the seat S, the distance between the head of the passenger and the headrest HR at the time of a rear-end collision differs. Accordingly, the time taken for the head of the passenger to hit against the headrest body 12 slightly varies. More specifically, there are a case where the head hits against the headrest body 12 after the headrest HR has moved to the emergency position, and a case where the head hits against the headrest body 12 while the headrest body 12 is changing its position to the emergency position. For example, in a case where the head of the passenger hits against the headrest body 12 at the time when the headrest body 12 has moved to the position shown in FIG. 10, i.e., when the lock plate 80 is aligned with the third engagement recess portion 21 which is second from the bottom, each lock plate 80 is engaged with the third engagement recess portion 21 that is second from the bottom. Therefore, the headrest body 12, which is held at the position in FIG. 10, is restricted from the reversion to the normal position and receives the head of the passenger in this position.

For example, in a case where the head of the passenger hits against the headrest body 12 at the time that the lock plate 80 is positioned between the second engagement recess portion 20 and the topmost third engagement recess portion 21, the headrest body 12 is slightly pushed back until each lock plate 80 is aligned with the topmost third engagement recess portion 21. When the lock plate 80 engages with the topmost third engagement recess portion 21, the reversion of the headrest body 12 to the normal position is restricted, so that the headrest body 12 receives the head of the passenger at this position. In other words, when the passenger's head hits against the headrest body 12 of the headrest HR while the headrest body 12 is changing its position from the normal position to the emergency position, the lock plate 80 is brought to be engaged with the third engagement recess portion 21 adjoining to the normal position of the lock plate 80, so that the headrest body 12 receives the passenger's head at the position where the lock plate 80 is engaged with the third engagement recess portion 21.

The head of the passenger which has hit against the headrest body 12 often bounces forward once due to the reaction of the collision. Therefore, at the moment the head moves away from the headrest body 12, the headrest body 12 changes its position to the emergency position due to the urging force of the first torsion spring 60, and the lock plate 80 is engaged with the second engagement recess portion 20. In other words, the headrest HR receives the passenger's head during the positional change from the normal position to the emergency position, and then moves to the emergency position so as to receive the head again.

On the other hand, to return the headrest body 12, shifted to the emergency position, to the normal position, as shown in FIGS. 9A and 9B, the headrest body 12 is pushed toward the normal position while sliding each lock plate 80 with the operation section 82 being pressed with a finger. More specifically, when the lock plate 80 slides, the edge engagement portion 81 of the lock plate 80 is disengaged from the second engagement recess portion 20, permitting the headrest body 12 to move to the normal position. When the headrest body 12 moves toward the normal position, the rotary support member 50 rotates toward the first position against the urging force of the first torsion spring 60. Then, at the time when the rotary support member 50 moves to the first position, the rotary support member 50 contacts the lock member 70, causing the lock member 70 elastically urged into the first state by the second torsion spring 78 to change its state to the second state. When the rotary support member 50 comes to the first position, the lock member 70 returns to the first state, so that the hook portion 76 of the lock member 70 is locked with the rotary support member 50. Therefore, the rotary support member 50 is held again in the first position, holding the headrest body 12 at the normal position.

The headrest HR of the embodiment, accordingly, demonstrates the following action and effects. First, the positional change of the headrest body 12 from the normal position to the emergency position is caused by the rotation of the rotary support member 50 and the sliding of the headrest body support 34A along the support stay 14 in the position changing mechanism M. In other words, since the headrest body 12 which changes its position is supported while being guided by the support stays 14, 14, the position changing mechanism M comprises fewer components, leading to making the headrest body 12 compact and lighter and also ensuring cost down. When the headrest body 12 changes its position to the emergency position, each of the headrest body 12 and the headrest support 10 comes in plane contact with the rotary support member 50 which is a single member, so that the headrest support 10 can receive the impact force originated from the hitting of the head of the passenger against the headrest body 12.

When the head of the passenger hits against the headrest body 12 that has moved to the emergency position, the lock plate 80 engages the second engagement recess portion 20 provided in the support stay 14, and therefore the reversion of the headrest body 12 to the normal position is restricted, so that the headrest body 12 properly receives the head of the passenger. When the head of the passenger hits against the headrest body 12 which is moving toward the emergency position from the normal position, the lock plate 80 engages any one of the three third engagement recess portions 21 provided in the support stay 14, and therefore the reversion of the headrest body 12 to the normal position is restricted, so that the headrest body 12 properly receives the head of the passenger.

Further, the position hold mechanism H comprises the lock plate 80 provided in the outer bottom surface of the headrest body 12, and the second engagement recess portion 20 and third engagement recess portions 21 both provided in the support stay 14, making the structure for holding the headrest body 12 simpler. Furthermore, since the lock plate 80 is attached to the bracket 94 that is secured to the lower portion of the headrest body 12, it is unnecessary to provide a means for attaching the lock plate 80 to the headrest body 12. Because the lock plate 80, the second engagement recess portion 20 and the third engagement recess portions 21 are provided outside the headrest core 30, the space for those components need not to be provided inside the headrest core 30, allowing the headrest body 12 to be compact. Further, the lock plate 80 can be disengaged from the second engagement recess portion 20 or the third engagement recess portion 21 when the operation section 82 is pushed with a finger to slide the lock plate 80. Therefore, no additional reset tool is required at all, and it is possible to easily and quickly execute an operation of returning the headrest body 12, shifted to the emergency position, to the normal position.

Because the headrest body 12 is not divided, a parting line does not appear on the outer design surface of the headrest body 12, improving the design of the headrest HR. Since a foreign object does not enter the headrest body 12, it is unnecessary to provide an additional member for preventing penetration of a foreign object, and a trouble of the position changing mechanism M is unlikely to occur.

Further, the middle support portion 14B of the support stay 14 extends in a forward inclined state, so that the headrest body 12 generally moves forward in the process of moving from the normal position to the emergency position, and can receive the head of the passenger at the time when the backward movement of the head is in a small amount.

Modifications

As is apparent from FIG. 1, in the headrest HR of the shown embodiment, the forward inclined state of the headrest body 12 locating in the emergency position can be adjusted by changing the axial distance between the first axial member 46 and the second axial member 48. For example, when the axial distance between the first axial member 46 and the second axial member 48 is set larger, then the amount of forward displacement of the upper portion of the headrest body 12 increases, making it possible to increase the forward inclined state of the headrest HR shifted to the emergency position.

As is further apparent from FIG. 1, in the headrest HR of the embodiment, the forward inclined state of the headrest body 12 locating in the emergency position can be adjusted by changing the angle of inclination of the middle support portion 14B of each support stay 14. For example, by way of setting the angle of forward inclination of the middle support portion 14B larger it is possible to increases the amount of forward displacement of the lower portion of the headrest body 12, thus making it possible to decrease the forward inclined state of the headrest HR shifted to the emergency position. On the other hand, when the angle of forward inclination of the middle support portion 14B is set smaller (closer to the perpendicular state), the amount of forward displacement of the lower portion of the headrest body 12 decreases, thus making it possible to increase the forward inclined state of the headrest body 12 shifted to the emergency position.

Although, in the above-described embodiment, the rotary support member 50 is pivotally supported on the front side of the headrest support 10 and is further pivotally supported by the front half body 31 of the headrest core 30, the layout of the rotary support member 50 is not limited to this particular form. For example, the rotary support member 50 may be pivotally supported on the rear side of the headrest support 10, and may be pivotally supported by the rear half body 32 of the headrest core 30. When the rotary support member 50 is pivotally supported by the rear half body 32, the state of extending rearward from the headrest support 10 approximately horizontally is the first position of the rotary support member 50 corresponding to the normal position of the headrest HR, and the state of extending upward from the headrest support 10 approximately vertically is the second position of the rotary support member 50 corresponding to the emergency position of the headrest HR.

Furthermore, in the above-described embodiment, the double torsion type first torsion spring 60 is a rotating means however, the rotating means is not limited to a torsion spring, and any other means, such as a compression coil spring, a leaf spring or a motor, can be used as a rotating means as long as it can instantaneously rotate the rotary support member 50 from the first position to the second position.

In addition, in the foregoing description, the headrest body 12 is supported in a movable manner, and the guide section provided with the second engagement recess portion 20 and the third engagement recess portions 21 is a part (middle support portion 14B) of the support stay 14; however, the guide section can be a separate component from the support stay 14. For example, action and effects similar to those of the above-described embodiment can be acquired by a structure in which a guide section extending downward from the fixed support member 16 is provided in the lower center portion (between both support stays 14, 14) of the fixed support member 16 constituting the headrest support 10, and an engagement member, such as the lock plate 80, is disposed at a position adjacent to the guide section of the headrest body 12.

Furthermore, in the foregoing description, the headrest body support 34A provided in the bottom wall portion of the front half body 31 of the headrest core 30 of the headrest body 12 is formed integrally with the front half body 31; however, the headrest body support 34A may be formed separately from the front half body 31 and attached thereto.

Although the foregoing description is given to the case that the second engagement recess portion 20 and the third engagement recess portions 21 are provided in each support stay 14, the second engagement recess portion 20 and the third engagement recess portions 21 may be provided only in one (right or left) of the support stays 14. The number of the third engagement recess portions 21 formed in the support stay 14 is not limited to three as in the shown embodiment, it can be two or less or four or greater. The third engagement recess portions 21 may be omitted and only one second engagement recess portion 20 may be provided, so that the lock plate 80 is engaged only when the headrest body 12 changes its position to the emergency position.

Furthermore, in the above-described embodiment, the guide portions of the second engagement recess portion 20 and each third engagement recess portion 21 are, respectively, flat-shaped inclined portions 20B and 21B; however, the guide portions need not to be flat. The guide portions can take any form as long as they permit passing of the lock plate 80 moving toward the fixed support member 16 from the tip side of the support stay 14. For example, each guide portion can be an inclined portion having a convex curved surface or a concave curved surface.

Though, in the embodiment, the second engagement recess portion 20 is provided with the inclined portion 20B, the inclined portion 20B can be omitted if the headrest body 12 is configured not to move further upward from the emergency position.

Furthermore, in the foregoing description, the lock plate 80 is attached to the bracket 94 that is secured to the outer bottom surface of the headrest body 12; however, the lock plate 80 may be directly disposed in the headrest body 12 itself. In addition, the lock plate 80 needs not to be a rectangular frame that is provided at the center with an opening through which the support stay 14 is to be inserted, and it may be formed like a mere flat plate, which is caused to come closer or away from the support stay 14.

In the above-described embodiment, the pressure receiving mechanism 100 comprising the pressure receiving plate 102 and the abutment member 104 serves as a rear-end collision detecting means. However, the rear-end collision detecting means is not limited to this pressure receiving mechanism 100, and it can take various other forms practically used or proposed at present. For example, various switches, such as a push-type switch and a limit switch, or various sensors, such as a shock sensor and a pressure sensor, can be adopted as the rear-end collision detecting means. In addition, in the embodiment described above, the first wire 86 mechanically coupled to the second wire 90 provided in the seat back S1 is illustrated as a disengagement means; however, the disengagement means can be a chain, a string or the like. Further, in a case where the rear-end collision detecting means and the engagement holding means operate electrically, the disengagement means can be an electric cord or the like which is connected electrically.

Furthermore, the rear-end collision detecting means can be disposed inside the headrest body 12. When the rear-end collision detecting means is thus disposed inside the headrest body 12, the disengagement means is provided inside the headrest body 12.

As seen from the above, according to the headrest of the present invention, the position changing mechanism that changes the position of the headrest body from the normal position to the emergency position and the position hold mechanism that holds the headrest body in the emergency position have simple structures. As a result, it is possible to achieve size reduction, weight reduction, cost down and improvements in the design and operability.

What is claimed is:

1. A movable headrest provided on a seat back of a seat mounted in a vehicle and capable of changing a position from a normal position to an emergency position, comprising:
   a headrest support supported by the seat back and having a guide section;

a rotary support member pivotally supported by the headrest support with a first axial member between a first position corresponding to the normal position and a second position corresponding to the emergency position; and a headrest body pivotally supported by the rotary support member with a second axial member and having a headrest body support which is formed with an insertion hole into which said guide section is inserted, wherein as the rotary support member rotates relative to the headrest support, the second axial member moves along an arcuate locus about the first axial member, and a position of the headrest body relative to the headrest support changes while the headrest body support moves along the guide section.

2. The headrest according to claim 1, wherein the guide section is provided in a support stay which constitutes the headrest support and is coupled to the seat back, said guide section being gradually inclined forward with respect to said seat back toward an upper portion of the guide section.

3. The headrest according to claim 2, further comprising:

a first engagement section provided in an engagement member which is disposed at a bottom of the headrest body and kept urged so as to contact the guide section; and a second engagement section that is a recess provided in an outer surface of the guide section and is aligned and engaged with the first engagement section when the headrest body shifts to the emergency position.

4. The headrest according to claim 3, wherein the engagement member has an operation section that separates and disengages the first engagement section from the second engagement section.

5. The headrest according to claim 4, wherein the engagement member is disposed at a bracket fixed to the bottom of the headrest body.

6. The headrest according to claim 3, wherein the guide section is provided with a third engagement section between a position where an engagement member of the headrest body in the normal position is located and the second engagement section, the third engagement section is a recess formed in an outer surface of the guide section and is provided at a lower side thereof with an engagement step with which the first engagement section is engaged and at an upper side thereof with a guide portion which inclines upwards toward an outer surface of the guide section form a deep inside of the engagement step, so that when the first engagement section of the engagement member is engaged with the engagement step, the headrest body is prevented from returning to the normal position.

7. A movable headrest provided on a seat back of a seat mounted in a vehicle and capable of changing a position from a normal position to an emergency position, comprising:

a headrest support supported by the seat back and having a guide section, a rotary support member pivotally supported by the headrest support with a first axial member between a first position corresponding to the normal position and a second position corresponding to the emergency position; and a headrest body pivotally supported by the rotary support member with a second axial member and having a headrest body support which is formed with an insertion hole into which said guide section is inserted, wherein as the rotary support member rotates relative to the headrest support, the second axial member moves along an arcuate locus about the first axial member, and a position of the headrest body relative to the headrest support changes while the headrest body support moves along the guide section;

the guide section is provided in a support stay which constitutes the headrest support and is coupled to the seat back, said guide section being gradually inclined forward with respect to said seat back toward an upper portion of the guide section; and when the rotary support member is at the second position, the rotary support member has a first abutment face, which is formed on a back face of a projection provided on top face of said rotary support member, and a second abutment face, which is formed on a front face of said rotary support member; and wherein when the rotary support member rotates to the second position from the first position, the first abutment face abuts on said headrest support and prevents a further rotation of the rotary support member, and said second abutment face abuts on the headrest body.

8. The headrest according to claim 7, further comprising:

a rotating means that rotates the rotary support member from the first position to the second position;

an engagement holding means that engages and holds the rotary support member in a disengageable manner to restrict a rotation of the rotary support member caused by the rotating means; and a disengaging means that disengages the engagement holding means from the rotary support member to permit the rotating means to rotate the rotary support member.

* * * * *